(12) United States Patent
Zagami et al.

(10) Patent No.: US 8,810,436 B2
(45) Date of Patent: Aug. 19, 2014

(54) MARITIME OVERBOARD DETECTION AND TRACKING SYSTEM

(75) Inventors: Anthony Zagami, Jupiter, FL (US); Joseph Carvalko, North Palm Beach, FL (US)

(73) Assignee: Security Identification Systems Corporation, West Palm Beach, FL (US)

( * ) Notice: Subject to any disclaimer, the term of this patent is extended or adjusted under 35 U.S.C. 154(b) by 270 days.

(21) Appl. No.: 13/412,826

(22) Filed: Mar. 6, 2012

(65) Prior Publication Data

US 2012/0229282 A1    Sep. 13, 2012

Related U.S. Application Data

(60) Provisional application No. 61/451,151, filed on Mar. 10, 2011.

(51) Int. Cl.
*G08B 23/00* (2006.01)
*G01S 17/02* (2006.01)
*G08B 13/183* (2006.01)
*H04N 7/18* (2006.01)
*G08B 13/196* (2006.01)

(52) U.S. Cl.
CPC ............ *G08B 13/183* (2013.01); *G01S 17/023* (2013.01); *G08B 13/19647* (2013.01); *G08B 13/19697* (2013.01); *G01S 17/026* (2013.01); *H04N 7/18* (2013.01)
USPC .................. 340/984; 340/573.6; 342/357.55; 441/89

(58) Field of Classification Search
CPC .......... B63C 9/0005; B63C 9/00; B63C 9/20; B63C 9/22; B63C 9/26; G07C 5/0891; B60R 11/04
USPC ......... 340/984, 573.6, 557; 701/32.2; 441/80, 441/89; 342/27, 28, 357.55; 367/131; 348/148, 169
See application file for complete search history.

(56) References Cited

U.S. PATENT DOCUMENTS

| | | | | |
|---|---|---|---|---|
| 5,190,256 | A * | 3/1993 | Macchiarella | 248/177.1 |
| 5,886,635 | A * | 3/1999 | Landa et al. | 340/573.6 |
| 7,679,530 | B2 * | 3/2010 | Waquet | 340/984 |
| 7,804,426 | B2 * | 9/2010 | Etcheson | 340/937 |
| 7,893,958 | B1 * | 2/2011 | D'Agostino | 348/148 |
| 2002/0186149 | A1 * | 12/2002 | Knaak | 340/984 |
| 2005/0164575 | A1 * | 7/2005 | Boice | 441/82 |
| 2009/0219160 | A1 * | 9/2009 | Shervey et al. | 340/573.6 |
| 2009/0276148 | A1 * | 11/2009 | Arvidsson | 441/89 |
| 2011/0068938 | A1 * | 3/2011 | Witzel et al. | 340/600 |
| 2012/0320219 | A1 * | 12/2012 | David et al. | 348/169 |

* cited by examiner

*Primary Examiner* — Thomas Mullen
(74) *Attorney, Agent, or Firm* — Joseph R. Carvalko

(57) ABSTRACT

A process and system for detecting the presence of a person overboard including: setting the perimeter of an area to scan, scanning the area 180 degrees in azimuth utilizing a laser beam for receiving a reflection of the laser beam off the person, detecting the reflection and playing back a video recording of the trajectory of the person, wherein the area above and below the perimeter of an area to scan is continuously video recorded and wherein upon detecting the target, one or more of audio and visual alarms alert that crew, and wherein an alarm with location is sent to PDA system with GPS coordinates time and date. Additionally a launcher deploys a device to track the person overboard, and allows persons on the ship or in a control center to ascertain the location of the person overboard.

7 Claims, 5 Drawing Sheets

FIG 4 (a)
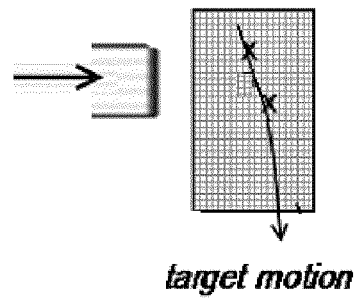
target motion
FIG 4 (b)
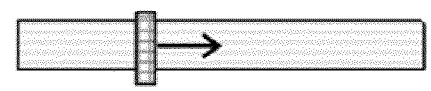
◄──── scan 180 degrees ────►
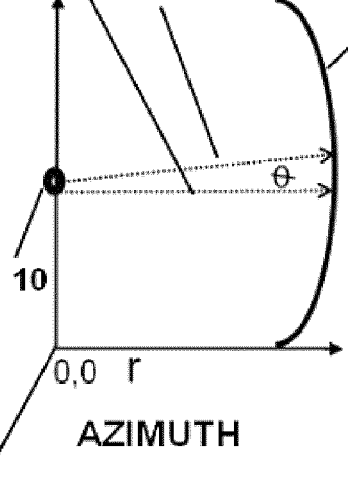
FIG 4(c)
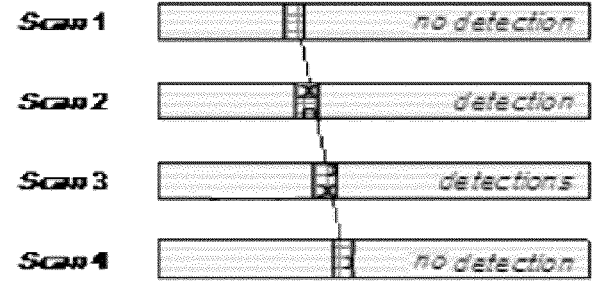
FIG 4 (d)

MARITIME OVERBOARD DETECTION AND TRACKING SYSTEM

CROSS-REFERENCE TO RELATED APPLICATIONS

The present application is related to, and incorporates by reference, the following application having the same assignee as the present application: US Patent Application Publication Number 2010-0282839, entitled "Method and System for the Mobile Tracking and Accounting of Individuals in a Closed Community," having application Ser. No. 12/387,856, filed May 7, 2009 and seeks the benefit of the earlier filing date under 35 USC 120 provisional patent application entitled "Maritime Overboard Detection and Tracking System" having application Ser. No. 61/451,151, filed Mar. 10, 2011.

FIELD OF THE INVENTION

This application relates generally to shipboard security systems, and more particularly to alerting the crew in the event that a person falls overboard.

BACKGROUND OF THE INVENTION

This invention provides an apparatus, system and method for ship surveillance, detection and recording a person 2 overboard event as illustrated in FIG. 1, or a potential threat to the ship from an intruder having intentions to board the ship. Surveillance and early detection systems that signal when a person falls overboard from a commercial, military or cruise ship have become increasingly more desirable as the true number of people falling overboard becomes apparent. In addition the early detection systems to signal when an intruder is within the zone of threatening to board a vessel without permission, such as terrorists or pirates, have become increasingly necessary as more and more ships are being pirated.

When dealing with person overboard scenarios there are few moments to spare in stopping the vessel, turning the propulsion machinery away from the person overboard before a true catastrophe at sea occurs, and initiating a rescue. Depending on environment and extraneous circumstances, a crew may only have moments to even detect the person overboard and initiate rescue before it is too late. To work effectively each major component in the system must work in tandem with one another to provide the fast response times such that crew members can appropriately respond to the emergency occurring within a prescribed perimeter that surrounds the vessel.

Until now solving the person overboard problem had not yielded satisfactory solutions, in part because the sensors required to detect an event that occurred over a span of 180 degrees in close proximity to the sensor head and thereafter accompanied by the means to capture the event itself were unavailable. A significant reason why a satisfactory solution has not been found is that the detection of a relatively small object (e.g., size of a baby) falling from a ship, relative to a sensing and detection mechanism, has a very high angular rate of change. On the other hand the recording of such object must precede its detection and encompass the entire trajectory of the object from the point of departure from the ship until it contacts the water. The present invention solves each of these problems in an integrated system that has a commercial application due to its sensitivity, accuracy of positioning and low cost.

SUMMARY OF THE INVENTION

This invention provides a novel method for a sensor mechanism to scan and detect the presence of a person overboard or the presence of an intruder external to a ship. Upon the detection of an object the sensor mechanism initiates various alarms, such as flashing lights and audio alarms to draw attention to the area in question. In the case of a person overboard, a console alarm or software embedded alarm verifies that the detection is actually a person overboard alert and not a false alarm.

A video system maps the external area beyond the hull of the ship, which area is displayed on a security monitoring control panel to identify the sensor and display the corresponding area where the object caused the alarm. The detection system activates a record of the time, date of sensor activation and initiates a system to acquire the Global Positioning Satellite ("GPS") system coordinates. A video camera system positioned to view the area, over which the sensor constantly scans, records the area. When a person is detected, the camera system automatically videos the person and records the video, allowing the crew to playback the incident that caused the alarm and locate the position of the event. This same camera or a camera operating contemporaneously and in parallel permits the simultaneous panning of the area above and below the alarmed sensor to allow crew at the security console to view what occurred in real-time following the initiation of the alarm. Each camera has the functionality for a long range audio device option which allows the crew to communicate instructions to the person overboard. These instructions can be prerecorded and completely automated.

More particularly an aspect of the present invention is a process for detecting a person falling overboard comprising: setting the perimeter of an area to scan, scanning the area in azimuth utilizing a laser beam for illuminating the person, receiving a reflection of the laser beam off the person, detecting the reflection, recording a video of the person, and upon detecting the reflection allowing for playing back the video recording of the person falling overboard.

Another aspect of the present invention is a system to detect and record the presence of a person overboard to a ship including: a laser beam scanner for radiating 180 degrees in azimuth, a receiver for detecting a reflection of the laser beam of a person overboard, a module for setting the configuration of the scanned area, a detector for processing the reflections of the person, and a video camera to record the trajectory of the person.

The system can also be tied into the shipboard public announcement system and can announce any prerecorded command desired to inform the crew of the emergency situation. The system can also be tied into a shipboard crew PDA system as described by reference to US Patent Application Publication Number 2010-0282839.

In addition to the detection of the person overboard, a device is launched from the ship into the body of water in the approximate location of where the person overboard has been estimated to contact the water. The device allows for tracking the individual through one or more technologies, using flares, orange smoke products, sound signaling, a radio tracker, flashing light or a dye that lays out a stream along the currents of water that also act upon the individual. The person overboard will be found in the general proximity to the terminus of the radio device, flashing light or the dye stream.

In one alternative embodiment an electronic flasher provides a beacon which is launched from the ship into the body of water in the approximate location of where the person overboard has been estimated to contact the water. Upon contacting the water the device flashes a light that can be seen by search and recovery personnel. The electronic flasher device is mounted in a construction designed to traverse, due to ocean currents and wind, the same approximate path as the victim, based on its shape and density characteristics, so as to be found in the approximate location of where the person overboard has been estimated to drift following contact the water.

In yet another alternative, a device such as an electronic tracker is launched from the ship into the body of water in the approximate location of where the person overboard has been estimated to contact the water. Upon contact with the water the device transmits a radio frequency. As above, the tracking device is mounted in a construction designed to traverse the same path as and will be found in the approximate location of where the person overboard has been estimated drift following contact the water. In the case of the electronic trackers the victim the search and recovery personnel will utilize a radio receiver to locate the electronic transmitter and the person overboard within its proximity.

In a given application, a multiple signal unit launcher may be positioned in a side-by-side array alongside the ship's bow for immediate deployment, each launcher containing a firing means that launches the tracking device into the water, so as to track the position of the person overboard.

BRIEF DESCRIPTION OF THE DRAWINGS

This invention is best understood from the following detailed description when read in connection with the accompanying drawing. The various features of the drawing are not specified exhaustively. On the contrary, the various features may be arbitrarily expanded or reduced for clarity. Included in the drawing are the following figures and equations:

FIGS. 4a-4d shows the laser scan in relation to the person in accordance with one embodiment of the present invention.

DETAILED DESCRIPTION OF THE INVENTION

In the figures to be discussed, the circuits and associated blocks and arrows represent functions of the process according to the present invention, which may be implemented as electrical circuits and associated wires or data busses, which transport electrical signals. Alternatively, one or more associated arrows may represent communication (e.g., data flow) between software routines, particularly when the present process or apparatus of the present invention is a digital process. The invention described herein utilizes electronic processors, such as computers having data storage means, to process the data and perform mathematical computations using algorithms for accomplishing the stated goal: determination of an initial-track having sufficient predictive validity from one scan's worth of detection.

Figure 1:
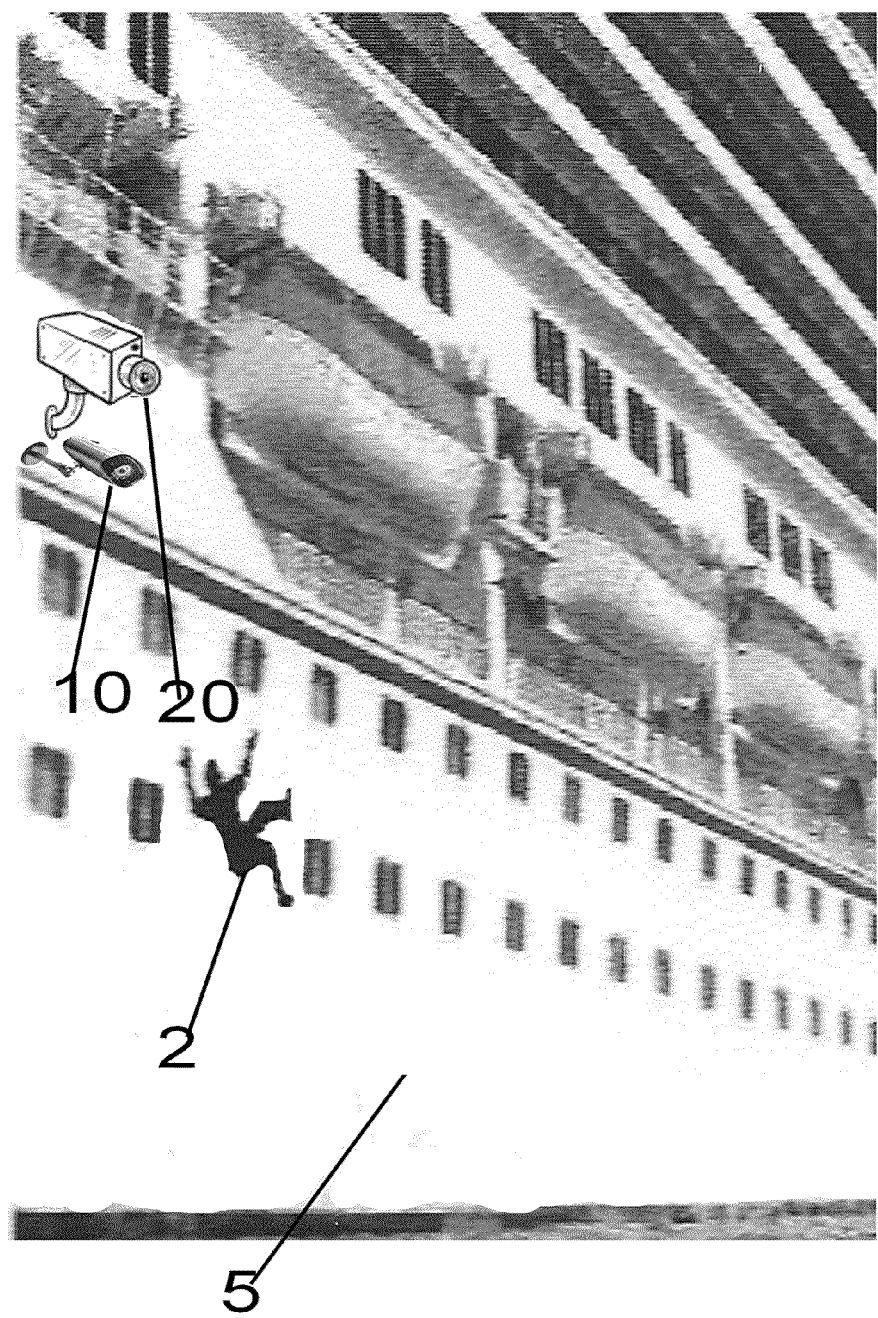
FIG. 1 illustrates a cruise ship and person falling overboard in accordance with one embodiment of the present invention.
Figure 2:
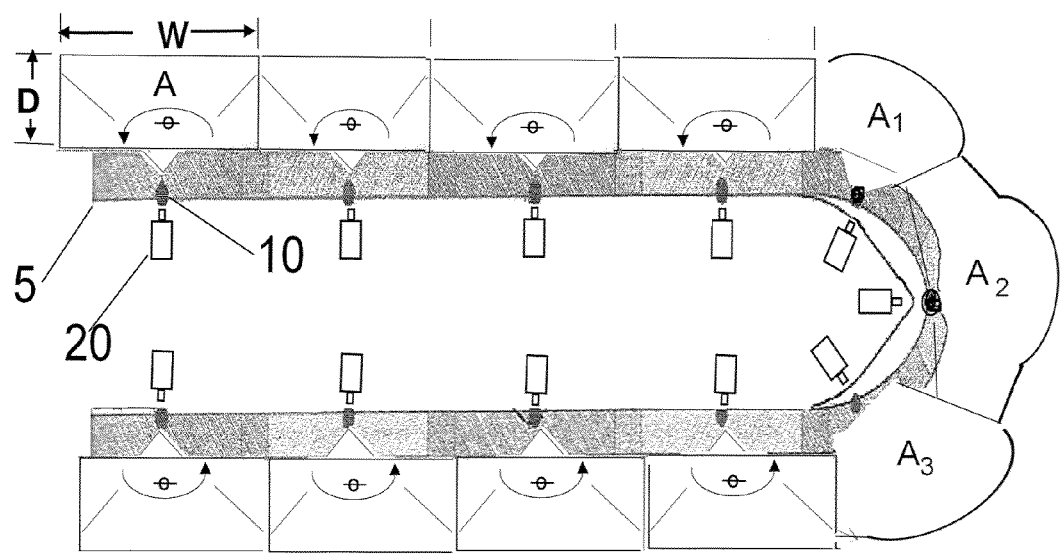
FIG. 2 the cross-section of a ship beneath the lowest deck having laser sensors and video cameras located in accordance with one embodiment of the present invention.

FIG. 2 shows the cross section of ship beneath the lowest deck (see FIG. 1), having one or more laser sensors 10 and associated one or more video camera systems 20 located in accordance with one embodiment of the present invention. With reference to FIG. 2, the invention provides a novel method for sensor mechanism 10 to scan and detect the presence of a person 2 overboard or the presence of an intruder external to a ship 5. As illustrated the sensors surround the ship's hull at a vertical location scanning an area defined as A relative to the hull, below the lowest deck were people are apt to travel. Upon the detection of an object passing through area A, such as person 2, the sensor laser mechanism 10 initiates various alarms, such as flashing lights and audio alarms to draw attention to the area in question. In the case of a person 2 overboard, a console alarm or software embedded alarm verifies that the detection is actually an overboard alert and not a false alarm.

As shown in FIG. 2, one embodiment of the invention has the ability to set the configuration of the area A scanned over which a potential target may be detected. This insures that each area is delineated precisely so that a target is not detected by two scanner receivers. The width ("W") dimension may be set as well as the range ("D") dimension such that the system 100 scans and detects targets in a generally rectangular box area. The areas A such as rectangular boxes as defined by azimuth and range are electronically arranged side-by-side such that no area is devoid of a scan and detection possibility. In the forward aft-section of the ship the dimensions of the area may be set, to adjust for the curvature of the ship's bow as shown by irregular areas $A_1$, $A_2$ and $A_3$ for example. The MEDS™ Perimeter Sensor Network supplied by Radio Zeeland DMP Americas, Fort Lauderdale, Fla. provides a device that tailors regular geometric and irregular-shaped areas such as A, $A_1$, $A_2$ and $A_3$ and scans and receives target detection within a 180 degree laser grid of protection. However, the MEDS™ system does not link into shipboard systems such as the shipboard crew PDA system as described by reference to US Patent Application Publication Number 2010-0282839. Additionally, the MEDS™ system does not video record the area or the trajectory of the person overboard.

Figure 3:
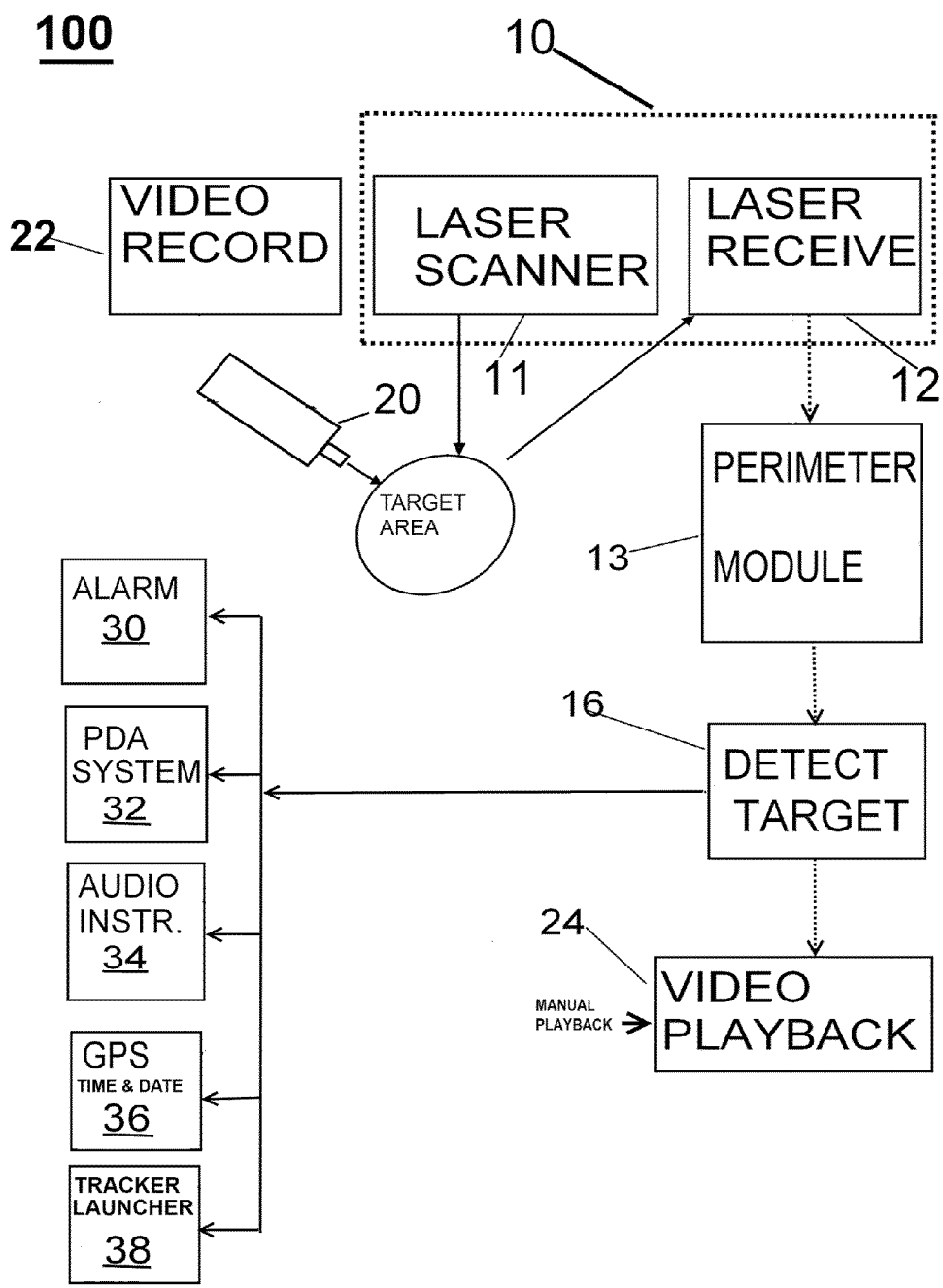
FIG. 3 is a block diagram of the person overboard detection and tracking system in accordance with one embodiment of the present invention.

With reference to FIG. 2, FIG. 3, system 100 includes the sensor 10 laser scanner 11 and laser receiver 12. Video camera system 20 maps external area A, beyond the hull of the ship 5, which area is displayed on a security monitoring control panel (not shown) to display the sensor location and the corresponding area where the person overboard 2 caused the alarm. The external area range and azimuth is set via perimeter module 13 so as to insure no overlap in areas under surveillance. A detection system 16 initiates a module 36 to record the time, date of sensor activation and initiates a system to acquire the GPS system coordinates. The GPS system coordinates may be displayed on a grid that is also displayed on security monitoring control panel (not shown). The PDA system 32 as by way of example and not limitation may be the system as described by reference to US Patent Application Publication Number 2010-0282839 for notifying the crew of the emergency. The activation and operation of these units are well-known to those with ordinary skill in the electrical engineering and computer arts.

Video camera system 20 is positioned and records the viewing the fields of view approximately from beneath the lowest deck to the water-line, having a range D and width W, essentially encompassing the line through which the sensor 10 constantly scans. When the person 2 is detected, the camera system 20 automatically captures the video of the person 2 and records the video on a video recorder 22, allowing the crew to playback on a video playback system 24 the incident that caused the alarm. This same camera system 20 or a camera operating contemporaneously and in parallel permits the simultaneous panning of the area below and above the sensor 10 to allow personnel at the security console to view what occurred in real-time following the initiation of the alarm. VideoIQ, Bedford, Mass. provides a camera system that when mounted in the proper position continuously videos fields of view approximately from beneath the lowest deck to the water-line and allows playback upon initiation of a signal from the detect target module 16 or upon initiation by the crew.

Each camera system 20 shown in FIG. 2 has the functionality for a long range audio instructional device option 34, which allows the crew to communicate instructions to the person 2 overboard. These instructions can be prerecorded and completely automated. The system 100 can also be tied into the shipboard public announcement system and can announce any prerecorded command desired to inform the crew of the emergency situation.

As indicated with reference to FIG. 4a-4d, in one embodiment the laser scanner system 10 scans the target or person overboard, in FIG. 4a, 180 degrees as shown in FIG. 4a. The full 180 degrees takes in one embodiment approximately 12 milliseconds as shown in FIG. 4b. By way of example and not limitation, using the familiar equations of a body falling from a vertical height, distance $D=\frac{1}{2}gt^2$ a falling body at the point of detection will be traveling at a velocity of 80 feet per second at the point at which a sensor is placed, 100 feet below the point of initial descent, reaches that point in 2.5 seconds. If the target passing through the scanner detection zone projects an image two-feet perpendicular to the scanner beam, then as illustrated in FIG. 4c, and FIG. 4d, in scan 1, no target is present, but on the next two subsequent scans the target moves through the field for detection after being received by the laser receiver 12. Finally in scan 4 the target is beyond the detection area A as it falls towards the water. If the assumption is that the smallest target will only project an image one-foot perpendicular to the scanner, then only one scan will detect the target. A body projecting an image of one-foot to the perpendicular direction of scan would be in the scanner's field of view for a dwell time of approximately 0.0125 seconds. A scan rate of 0.012 seconds would detect the target one time. Therefore the limit of the vertical distance from the theoretical point of initial descent would not exceed 100 feet if the system 100 were designed to detect targets one-foot minimum. Sensor distances closer to the anticipated point of initial descent would therefore detect targets smaller than one-foot in the perpendicular projection to the scanning beam.

The target passes through the beam at different instantaneous angular velocities dependent on the radial proximity of the target to the sensor and the vertical velocity of the target. The invention in one embodiment detects targets on the order of magnitude of one-foot across in its projection perpendicular to the beam. By way of example a scanning beam that sweeps 180 degrees in 12 milliseconds has an angular velocity of 0.02 radians at the distance of fifty-feet across a target one-foot in its projection perpendicular to the beam. Likewise a beam that sweeps 180 degrees (or $\pi$ radians) in approximately 12 milliseconds has an angular velocity of 0.20 radians at the distance of five-feet and 2.0 radians at a distance of one-foot across a target one-foot in its projection perpendicular to the beam. As the distance from the scanner increases the scanner dwell-time over the target decreases, such that at fifty-feet the dwell time for a beam scanning 180 degrees is 76 microseconds.

The present invention is a system to detect and record the presence of a person 2 external to a ship including scanning 180 degrees in azimuth, utilizing a laser beam to receive a reflection of the laser beam off the person, detecting the reflection, for the person in the range one foot to fifty feet from a laser beam transmitter, the person moving at an instantaneous angular velocity relative to the beam 0.2 radians per second to 0.02 radians per second and video recording the person, and utilizing the detecting of the person to allow playback of recording of the person's trajectory.

More particularly an aspect of the present invention is a process for detecting and recording the presence of a person 2 external to a ship including: a laser beam scanner radiating 180 degrees in azimuth for receiving and detecting a reflection of the laser beam off a person, establishing a perimeter of the scanned area, a detector for processing the reflections of persons in the range from one foot to fifty feet from laser beam transmitter, moving at an instantaneous angular velocity relative to the beam and moving at an instantaneous angular velocity relative to the beam 0.2 radians per second to 0.02 radians per second and a video camera to record the person trajectory and to playback recorded video following the detection.

Figure 5:
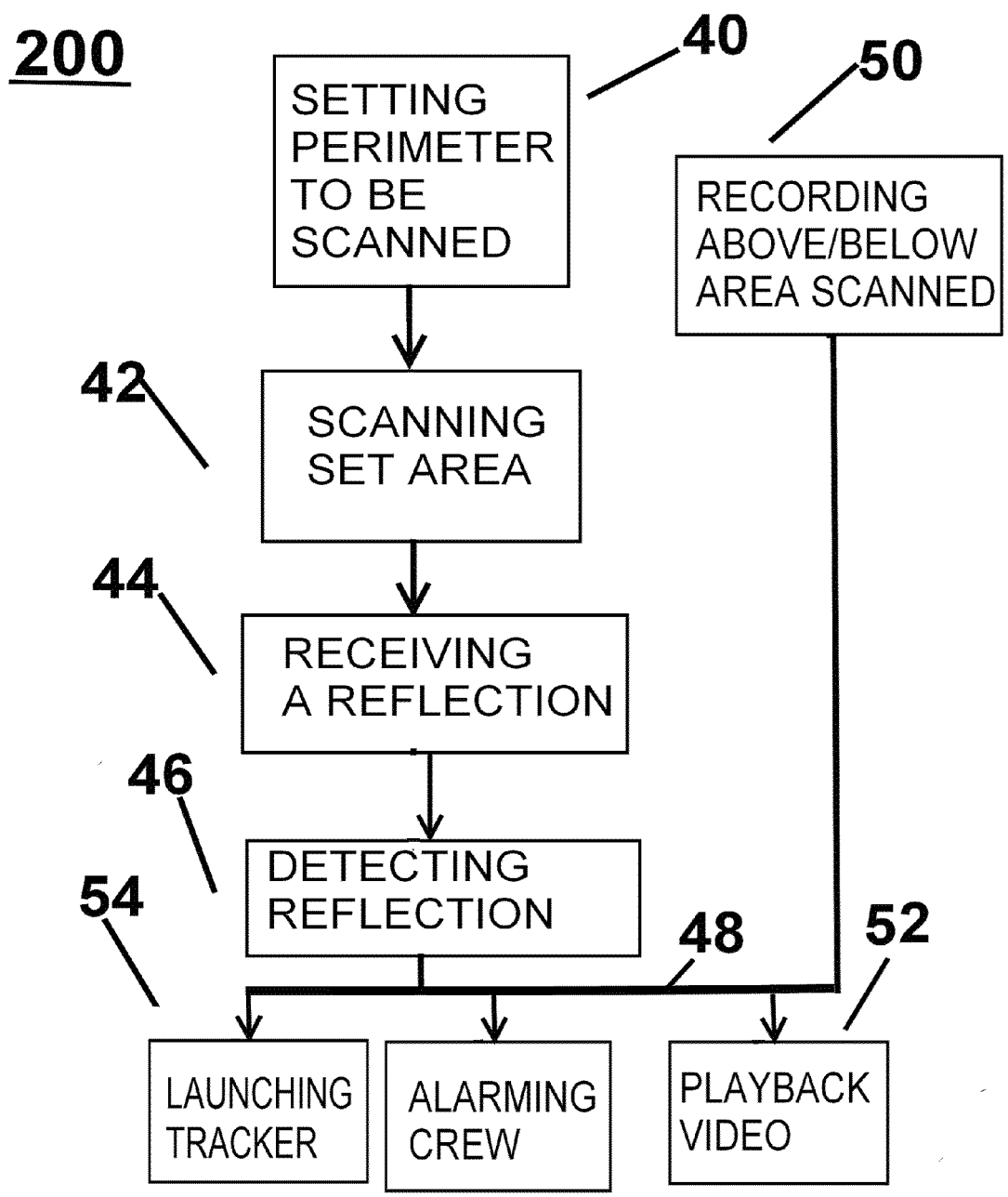
FIG. 5 is a block diagram of the process of detecting and tracking a person overboard in accordance with one embodiment of the present invention.

With reference to FIG. 5, process 200 for detecting and recording the presence of a person 2 overboard includes: setting the perimeter of an area to scanned 40, scanning 42 the area 180 degrees in azimuth utilizing a laser beam for receiving a reflection 44 of the laser beam off the person, detecting 46 the reflection and playing back 52 a recording 50 of the trajectory of the person. In one embodiment of the invention, the process 200 area of scanning is defined by a shape that extends in one dimension less than fifty feet from a laser beam transmitter. In yet another embodiment the process 200 detects a person external to a ship moving at an instantaneous angular velocity relative to the beam within the range of 0.2 radians per second to 0.02 radians per second. The process 200 further includes upon detecting 46 reflection from a target, one or more of (a) audio alarming, (b) a visually alarming a crew member as well as (a) transmitting an alarm to a PDA system, (b) transmitting the GPS coordinates to a PDA system, (c) transmitting the time and date to a PDA system.

It is understood that aspects of the subject invention as shown in FIG. 3, such as the means for setting the perimeter and other relate parameters such as range and azimuth detecting boundary, the detect target 16, alarm, 30, PDA System 32, audio instructions 32 and GPS Time and Date 36 may reside in program storage medium that operate in conjunction with associated processors(s), and in the process 200 and method steps that are undertaken by cooperative operation of the processor(s) based upon messages within the signal and data processing network. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD ROM or via Internet download.

In the form process 200 and system 100 apparatuses of the present invention are in part implemented by digital processors, the associated programming medium and computer program code that is loaded into and executed by a processor, or may be referenced by a processor that is otherwise programmed, to cooperate with the processor. Due to such programming, the processor or computer becomes an apparatus that practices the method of the invention as well as an embodiment thereof. When implemented on a general-purpose processor, the computer program code segments configure the processor to create specific logic circuits. Such variations in the nature of the program carrying medium, and in the different configurations by which computational and control and switching elements can be coupled operationally, are all within the scope of the present invention.

The invention herein also includes in one embodiment a system to locate a person overboard a ship including: a launch device, responsive to the detection of a person overboard, such that the launch device deploys at least one of: (a) visible marker dye on the water's surface, (b) a floatable smoke device, (c) a floatable sound signaling device, (d) a floatable electronic transmission device, (e) a floatable light device to track the person's location.

Turning to FIG. 3, system 100, when detect target, 16, receives an input from the perimeter module 13 it sends a signal to a tracker launcher 38, which initiates the deployment of a device particular to a mode of tracking the person overboard. Different devices may be used such as a marker dye for spreading a colored or luminous substance on the water's surface, a smoke product, a sound signaling device, a lighted beacon, or an electronic transmission device, such as a radio frequency beacon, each of which moves at the same rate and direction as the person in distress.

By way of example and not limitation, tracker launcher 38 launches a device embedded in a flotation device having the density, shape and other marine design considerations regarding floatation dynamics to float at the same rate and in the same direction as the person overboard.

The system 100 may be required to track a person overboard not merely in daylight but at night. Therefore if a dye tracking system is used the dye must be visible both during daylight and during nighttime. Therefore such dyes that are, by way of example and not limitation, capable of fluorescent emission upon activation by various forms of illumination such as ultraviolet radiation. The dye system may be replaced by a smoke system; again requiring a flotation device that drifts at the same rate and direction as the person overboard.

Other types of launched devices may be in the form of an electronic device, such as an EPIRB (emergency position-indicating radio beacon that signals maritime distress) that is, a commercially available device that provides radio signaling for locating the EPIRB. By way of example, floatable, waterproof EPIRBs may transmit a 406 MHz emergency message or a unique identifying number that can be received by any receiver, on the ship or external to the ship, having the capability of receiving such signals and identifying numbers. Such transmission may be received by system 100 in the form of GPS coordinates and may be displayed on a grid that is also displayed on security monitoring control panel (not shown). The waterproof EPIRB transmissions via system 100 can also be received by shipboard PDA system 32 as by way of example and not limitation the system as described by reference to US Patent Application Publication Number 2010-0282839 notifying the crew of the emergency and location of the person overboard. By way of example and not limitation, one such receiving device also may be a 406 MHz portable direction finder that guides search and rescue personnel.

Some types of EPIRBs also work in conjunction with a satellite system known as Cospas-Sarsat a search and rescue system that receives transmissions from EPIRB devices, such as would be deployed by the tracker launcher herein. A 406 MHz signal is received by the LEOSAR and the GEOSAR satellite systems, from the EPIRB tracker, which relay a 406 MHz emergency message to ground stations called local user terminals. The local user terminals calculate the location of the signal measuring the Doppler shift caused by the relative movement between the satellite and the beacon and forward the location to a mission control center. The mission control center can then alert search and rescue vehicles to locate the person overboard.

A special water activated rescue strobe may also be launched where it automatically armed when it comes in contact with water. Such devices can deliver 250,000 peak lumens strobe light in a 360° spread offering rescue visibility up to 1.2 miles. Other more powerful devices may also initiate a strobe light of 250,000 peak lumens that are visible at a distance of 6 miles on a clear, dark night.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is expressly intended that all combinations of those elements that perform substantially the same function in substantially the same way to achieve the same results are within the scope of the invention. Substitutions of elements from one described embodiment to another are also fully intended and contemplated. It is therefore contemplated that the appended claims will cover any such modifications or embodiments as fall within the true scope of the invention.

We claim:

1. A process for detecting a person falling overboard from a ship into a body of water comprising: setting the perimeter of an area to scan beyond the hull of the ship, scanning said area utilizing a laser beam transmitter mounted in the proximity of the hull for illuminating the person falling overboard as the person intercepts a laser beam, receiving a reflection of said laser beam from the person falling overboard utilizing a laser beam receiver mounted in the proximity of the hull for detecting the reflection of the laser beam, recording a video of the person falling overboard during a period of time while the person falls from the ship, and upon detecting the reflection of the laser beam from the person falling overboard, playing back the video recording of the person falling overboard, wherein the area to scan beyond the hull of the ship extends, in one dimension, less than fifty feet from the laser beam transmitter mounted in the proximity of the hull, and wherein the person falling overboard falls, at an angular velocity, relative to the distance at which the person falling overboard intercepts the beam, within the range of 0.2 radians per second to 0.02 radians per second.

2. The process in claim 1, further including, upon detecting the person falling overboard as the person intercepts the beam, alarming ship personnel using one or more of (a) audio alarming, (b) visual alarming, and (c) electronic alarming.

3. The process in claim 1, further including, upon detecting the person falling overboard as the person intercepts the beam, one or more of (a) transmitting an alarm to a PDA, (b) transmitting a GPS coordinate to a PDA, and (c) transmitting the time and date to a PDA.

4. The process in claim 1, further including, upon detecting the reflection of the beam from the person falling overboard, signaling to launch a tracking device to track the person overboard.

5. The process in claim 1, further including, launching at least one or more of (a) a visible marker dye on the body of water surface, (b) a floatable smoke device, (c) a floatable sound signaling device, (d) a floatable electronic transmission device, (e) a floatable light device, and (f) a water-activated rescue strobe.

6. The process in claim 5, wherein the floatable electronic transmission device is an emergency position-indicating radio beacon ("EPIRB") that signals maritime distress.

7. The process in claim 1, including transmitting a radio emergency signal.

* * * * *